UNITED STATES PATENT OFFICE.

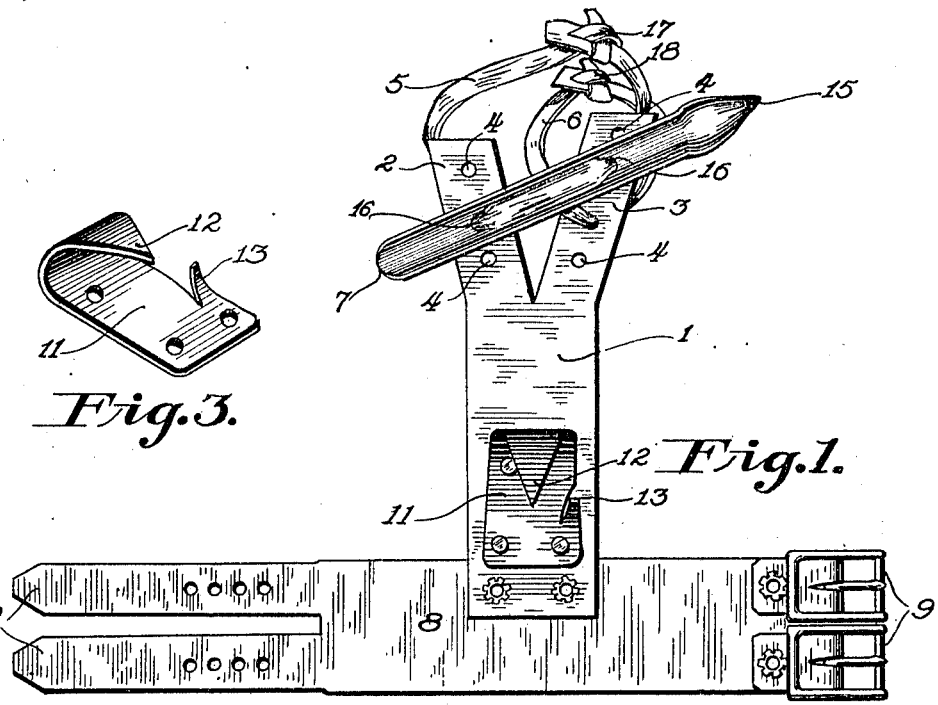

GEORGE FREDERICK KOCH, OF LA CYGNE, KANSAS.

CORN-HUSKER.

945,173.   Specification of Letters Patent.   Patented Jan. 4, 1910.

Application filed June 29, 1909. Serial No. 505,095.

*To all whom it may concern:*

Be it known that I, GEORGE FREDERICK KOCH, a citizen of the United States, residing at La Cygne, in the county of Linn and State of Kansas, have invented certain new and useful Improvements in Corn-Huskers, of which the following is a specification, reference being had therein to the accompanying drawing.

This invention relates to corn huskers, and the principal object of the same is to provide a husking implement with a novel type of husking pin and also with a husking hook, the pin being adjustable and the hook being provided with holding and guiding means for the husk so that the same may be properly held to the hook while being stripped from the ear.

In carrying out the objects of the invention generally stated above it will, of course, be understood that the same is susceptible of changes in details and structural arrangements, one preferred and practical embodiment of which is shown in the accompanying drawings, wherein—

Figure 1 is a plan view of the improved husking implement. Fig. 2 is a perspective view of the same attached to a glove. Fig. 3 is a detail perspective view of the husking hook detached.

Referring to said drawings by numerals, 1 designates the guard pad of the improved husking implement, the same being preferably of rawhide and made flat and elongated and having one end portion bifurcated to provide diverging arms 2 and 3 which are provided with a longitudinal row of openings 4 for the reception of the fastening bands 5 and 6 which hold the husking pin 7 transversely of said arms 2 and 3. The other end of the guard pad is riveted or otherwise suitably connected to a strap 8 one end of which is equipped with buckles 9 for engagement with the bifurcated members 10 at the other end of the strap, so that said strap may form a wristband adjustable for various sizes of wrists.

Intermediate of the wristband of the husking implement, the guard pad 1 is provided with a longitudinally arranged husking hook 11 which is formed of a flat plate of steel one end of which is pointed and upturned as indicated at 12 to provide a tearing hook for engagement with the husk. Said plate is riveted or otherwise rigidly secured to the pad 1, and has one of its longitudinal edges slitted and the material upturned to form a pointed guard 13 which serves to hold the husk to said hook 12 during the stripping operation and also serves to hold the husk until the ear has been grasped by the free hand of the husker, as will be understood.

The husking implement is preferably used in connection with a glove 14 as shown in Fig. 2 of the drawings and the fastening bands 5 and 6 for the pin 7 preferably pass about the second and third finger stalls thereof so as to hold the said pin transversely of the glove with its pointed end 15 projecting between the first finger stall and the thumb stall. The pin 7 has the usual concavo-convex body, through which openings 16 are formed for the fastening bands 5 and 6, or for but one of them, as is suggested in one of the many ways of securing said pin to the arms of the pad in the accompanying drawings.

Referring more particularly to Fig. 1 it will be seen that the band 5 passes about two fingers or stalls, preferably the second and third, through one of the intermediate openings of one of the arms, and through both the openings of the pin, the free ends of the band being looped and knotted, as indicated at 17, or secured together in any other convenient or desirable manner. The band 6 passes around the second finger or stall and through an intermediate opening of the other arm of the pad 1, and the free ends thereof are secured together in a manner similar to the ends of the band 5, and as indicated by the numeral 18. It will be obvious that the pin may be adjusted longitudinally of the said arms by passing the band which secures it to the arms, through one of the other openings.

From the foregoing it will be seen that through the use of the described flexible pad the same will readily respond to the movements of the user's hands, and through the described manner of connecting the pin to the arms of said plate, said pin may be adjusted when desired or necessary, and the bands which retain said pin in adjustable engagement with the said pad, also provide the means for holding one end of the implement in engagement with the hand of the user, the other end of the implement being retained in engagement with the wrist by means of the described adjustable wristband.

A prominent feature of the invention is the use of the husking hook and the guard therefor. It will be readily seen that as the same is formed from a single sheet of material, it may be economically produced and will efficiently perform both the tearing of the husk from the ear, and also assure of the husk being held in engagement with the hook during the tearing or stripping operation.

While the invention has been shown as used in connection with a glove, it is to be understood that the same is not necessary but is only employed as a safeguard for the hands, the invention *per se* residing in the employment of the guard pad provided with an adjustable pin at one end portion and a tearing hook and guard adjacent to the other end, combined with means for securing the said pad to a hand of a husker.

What I claim as my invention is:—

1. A husking implement comprising a guard pad having one end bifurcated and each branch provided with a longitudinal row of openings, a husking pin also provided with openings, and fastening bands for adjustably holding said pin in engagement with said bifurcated end and also securing the pad to a hand of the user.

2. A husking implement comprising a guard pad having one end bifurcated and each branch provided with a longitudinal row of openings, a husking pin also provided with longitudinal openings, fastening bands for adjustably securing the pin to the bifurcated end of the pad and also attaching the said end to the fingers of the user, and a wristband for the other end of said pad.

In testimony whereof I hereunto affix my signature in presence of two witnesses.

GEORGE FREDERICK KOCH.

Witnesses:
C. E. CLINE,
A. W. RUSH.